INVENTOR.
Albert E. Slade
BY
Roberts, Cushman & Grover
ATT'YS

SUPERCONDUCTIVE MEMORY

Filed Aug. 11, 1961 3 Sheets-Sheet 2

Dec. 7, 1965 A. E. SLADE 3,222,655

SUPERCONDUCTIVE MEMORY

Filed Aug. 11, 1961 3 Sheets-Sheet 3

3,222,655
SUPERCONDUCTIVE MEMORY
Albert E. Slade, % Arthur D. Little Inc., 15 Acorn Park, Cochituate, Mass.
Filed Aug. 11, 1961, Ser. No. 130,859
10 Claims. (Cl. 340—173.1)

This invention relates to electrical memory cells useful in computers, and particularly to a cell in which information can be stored in the form of a current flowing without diminution around a closed, wholly superconductive loop. The present invention involves the use of superconductive gates which, at temperatures near absolute zero, can be changed from a superconducting or zero resistance state to a normal or resistive state by the application of a critical magnetic field. Such a critical field is said to quench the gate to which it is applied.

It is an object of the present invention to provide a memory cell which is easily constructed in the form of a thin film, and which is conveniently manufactured in a multiple cell matrix in which access to the cells may be had in various ways at once to reduce the operating time of the matrix.

According to the invention a memory cell comprises a first superconductive path, a second superconductive path forming with the first path a closed, wholly superconductive loop, control means for quencing the first path, an output gate in quenching relation to the second path, and an interrogation conductor adjacent the second path.

For the purpose of illustration typical embodiments of the invention are shown in the accompanying drawings in which FIG. 1 is an isometric view of a memory cell;

Figure 1:
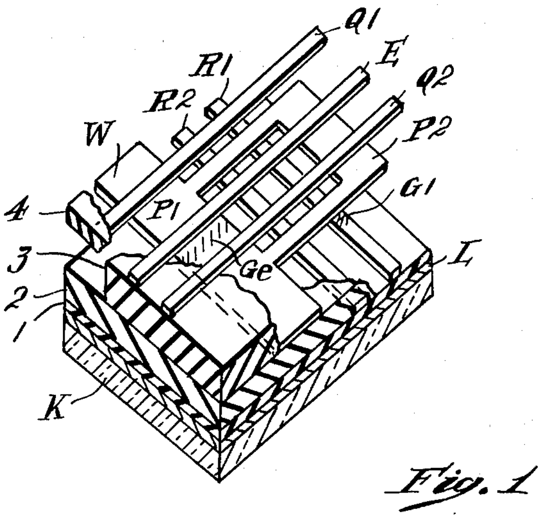
Figure 2:
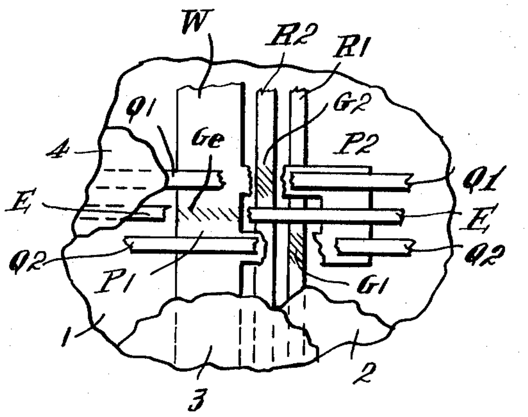
FIG. 2 is a plan view of the cell partly broken away.
Figure 3:
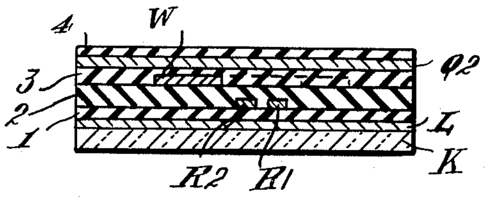
FIG. 3 is a vertical side sectional view of the cell.

In FIGS. 1 to 3 is shown a typical form of the present cell as manufactured by vacuum deposition on a suitable substrate K such as glass. Entirely over the substrate K is deposited a layer L of lead (Pb) covered by a layer 1 of insulation such as silicon monoxide 3000 A. thick. At a first level or stratum are deposited two read conductors R1 and R2 which, for example, may be lead (Pb) strips, 1500 A. thick and 0.005 inch wide, each having a tin gate portion, e.g., G1. In a second stratum, separated from the first by insulation 2, is a write conductor W which comprises a first path P1 to which is connected a second path P2, the first and second paths forming a closed, wholly superconductive loop. Each tin gate portion, e.g., G1, is closed under one of the parallel arms of the second path P2, the tin gate portion being substantially as long as the overlying path P2 is wide. The write conductor may be a lead (Pb) strip 3000 A. thick and 0.020 inch wide having a tin gate portion *Ge*. The branch path P2 may be a lead (Pb) strip 3000 A. thick and 0.005 inch wide. The gate portion *Ge* of the path P1 is under and substantially the same width as an enable conductor E. The enable conductor E and two interrogate conductors Q1 and Q2 are in a third stratum separated from the second by insulation 3. These conductors may be lead (Pb) strips 3000 A. thick and 0.005 inch wide. The enable conductor is in quencing relation to the gate portion *Ge* of path P1 in the write conductor W. The interrogate conductors Q1 and Q2 are in inductive relation to the parallel arms of path P2, that is, in juxtaposition such that current through either conductor Q1 or Q2 will induce a substantial current in path P2 of the loop P1, P2. Over the third stratum is a final insulation layer 4.

Figure 4:
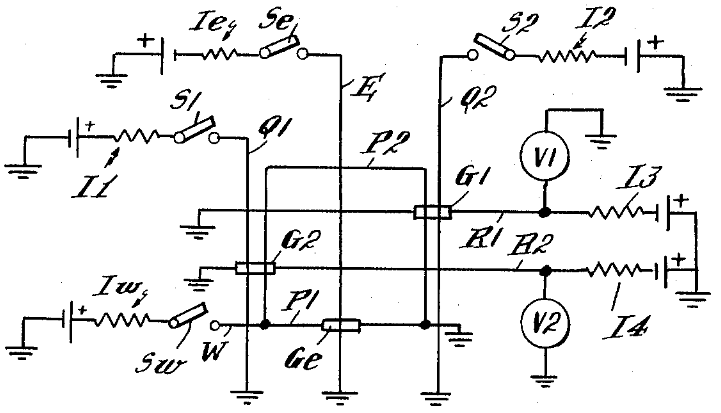
FIG. 4 is a schematic diagram of a cell circuit.

In FIG. 4 the cell of FIGS. 1 to 3 is shown schematically in association with circuits for enabling and writing persistent current information in the loop P1, P2 and for interrogating and reading out the information. By way of example the information may be the binary digit zero, represented by no persistent current, and the binary digit one, represented by clockwise persistent current. The third digit in a ternary system can be represented by counterclockwise persistent current.

The enable conductor E is interruptibly supplied from a constant current source *Ie* through a switch *Se*, and the write conductor W is interruptibly supplied from a constant current source *Iw* through a switch *Sw*. To establish a clockwise persistent current in loop P1, P2 these switches are operated in the sequence:

*Se* closed
*Sw* closed
*Se* opened
*Sw* opened

Figure 9:
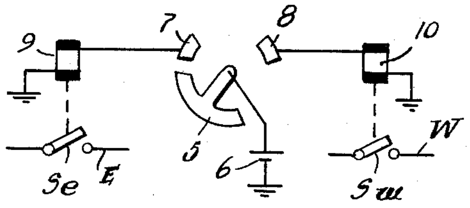
FIG. 9 is a schematic diagram of a switching circuit for controlling the cell of FIG. 3.

It should be understood that the switches are shown for the purpose of simplified illustration and that in large computers momentary pulses of current would be supplied by electronic or superconductive switching circuits. Similarly the sequencing circuit shown in FIG. 9 is exemplary of the function of switching circuits. In FIG. 9 a driven rotary wiper 5 connected to a battery 6 makes contact with terminals 7 and 8 successively, momentarily maintaining contact with both terminals 7 and 8, then breaking contact with 7 and 8 successively. These terminals are connected to relays 9 and 10 respectively, closing switches *Se* and *Sw* in the sequence given above.

The cells and matrices described are operated in a closed chamber at cryogenic temperature by submerison in liquid helium. To maintain tin and lead in superconducting state in the absence of critical magnetic fields the boling point of the helium is reduced to approximately 3.4° K. by reduction of the gas pressure in the chamber.

When switches *Se* and *Sw* are both closed, current in the enable conductor E quenches the enable gate *Ge* diverting all current to the write conductor W through path P2. When switch *Se* is opened current continues to flow clockwise in path P2 and out the write conductor. But when switch *Sw* is then opened, interrupting current to path P2, the current then flowing in path P2 is forced by the collapsing field of path P2 to persist through path P1. Path P2 is of substantially larger inductance with respect to the inductance of path P1, and hence the persistent current is only slightly reduced as it is established in the loop.

The presence or absence of persistent current in the loop P1, P2 is detected by supplying current to either of the interrogate conductors Q1 or Q2, and to the like numbered read gate G1 or G2. The interrogate conductor Q1 is supplied current from a source 11 through a switch S1. The interrogate conductor Q2 is supplied current from a source I2 through a switch S2. The first read gate G1 is connected in parallel with a voltmeter V1 and a current source I3. The second read gate G2 is in parallel with a voltmeter V2 and source I4.

Typical values of the current supplies are as follows. In the physical structures of FIGS. 1 to 3 a critical current of approximately one-half ampere in the enable conductor E produces a field sufficient to quench the enable gate Ge, taking into account the self field of the gate Ge resulting from current from the supply Iw. Similarly a net current of one-half ampere in one of the interrogate conductors Q1 or Q2 and in the loop P1, P2 is sufficient to quench one of the read gates G1 or G2, taking into account the small current from the sources I3 or I4. The amplitude of the current of the supplies may be in the following proportions, where Ik is the critical current of one-half ampere mentioned above:

$$Ie=Ik$$
$$Iw=\frac{1}{2}Ik$$
$$I1=I2$$
$$Ip=\frac{1}{2}Ik$$

The operation of a cell shown in FIG. 4 is as follows. The enable switch Se is closed supplying current to the enable conductor E and quenching the enable gate Ge in path P1. Current is then supplied through the write switch Sw, and conductor W to both paths P1 and P2 of the loop. Because of the resistance in the quenched enable gate Ge all current flows clockwise in the superconducting path P2. The enable switch Se is then opened unquenching the enable gate Ge, but current continues to flow in path P2 only. When switch Sw is then opened the clockwise current Ip persists somewhat reduced by the smaller inductance of path P2.

To interrogate whether a persistent current is or is not stored in the loop P1, P2 current is supplied to interrogate conductor Q1 and to the read conductor R1. If interrogate switch S1 is closed, current through the first interrogate conductor Q1 induces a clockwise current in the loop less than (approximately one half) that in conductor Q1. The field of the induced current and persistent current will at least partially oppose the field of conductor Q1 at gate G2, which therefore remains unquenched. The combined fields of the persistent and induced current will however be sufficient to quench the read gate G1 of read conductor R1 and a voltage drop will appear across voltmeter V1.

If, in a condition of clockwise persistent current, current were supplied to conductor Q2 through switch S2 a clockwise current would be induced in the loop P1, P2. The fields of the induced, inducing and persistent current would tend to cancel at gate G1 leaving it unquenched. At gate G2 the fields of the induced and persistent current would reinforce and quench gate G2 causing the corresponding indication of voltmeter V2.

If no persistent current existed in the loop P1, P2 then supply of current to either interrogate conductor Q1 or Q2 would leave both gates G1 and G2 unquenched.

Figures 5, 6:
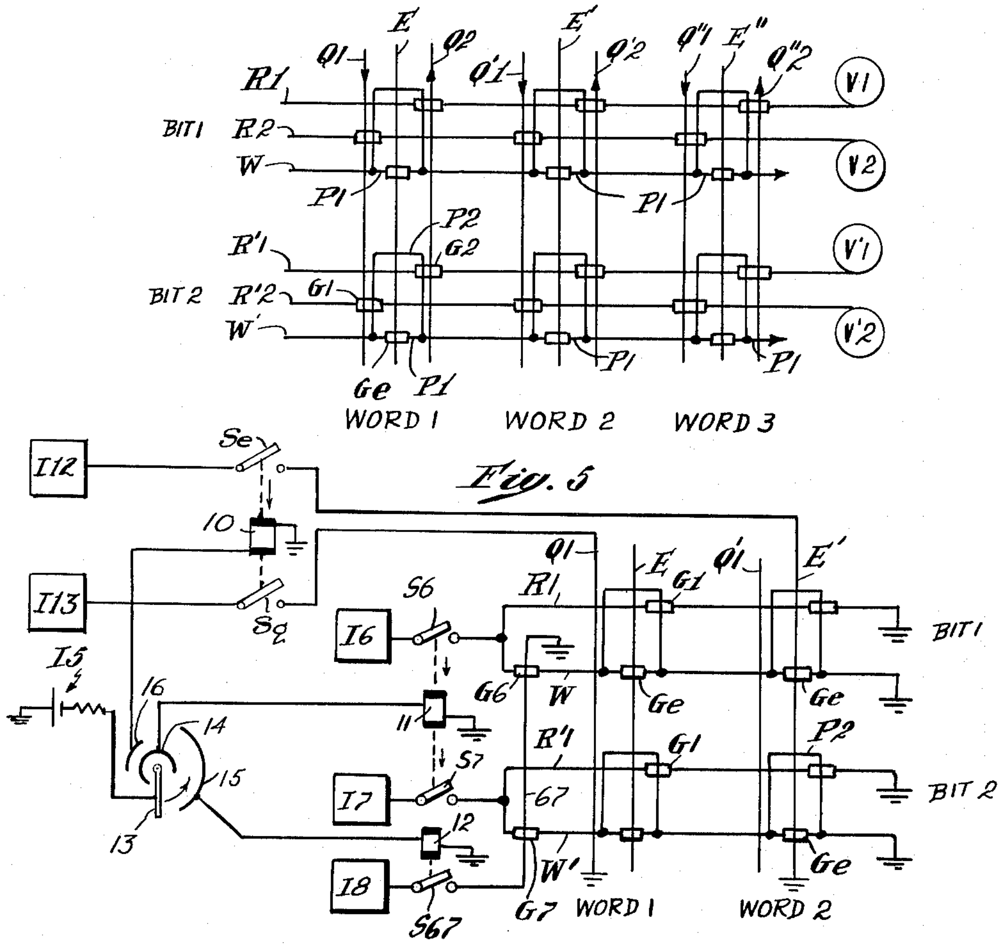
FIG. 5 is a schematic diagram of a maxtrix comprising a plurality of the cells of FIG. 4.
FIG. 6 is a schematic diagram of a modified matrix.

The matrix of FIG. 5 comprises a plurality of cells, each like the cell of FIG. 4. The cells are arranged in three vertical groups representing words 1, 2 and 3, each word having two bits or locations. Words 1, 2 and 3 are enabled respectively by conductors E, E′ and E″, and are interrogated respectively by conductors Q1 or Q2, Q′1 or Q′2 and Q″1 or Q″2. Location or bit 1 of each word receives write current through conductor W; bit 2 of each word receives write current through conductor W′. Location 1 of each word controls read conductors R1 and R2; location 2 controls conductors R′1 and R′2.

With the matrix of FIG. 5 it is possible to interrogate two words independently and simultaneously write a third word. For example, suppose word 1 has a zero (no persistent current) in bit 1, and a one (clockwise persistent current) in bit 2; word 2 has a one stored in both bits; and it is desired to write a one in bit 1 of word 3, and a zero in bit 2.

To interrogate word 1, conductors Q1, R1 and R′1 would be supplied current. R1 would not be quenched and V1 would indicate no persistent current; R′1 would be quenched and V′1 would indicate persistant current in location 2 of word 1.

To interrogate word 2, conductors Q′2, R2 and R′2 would be supplied current. Both conductors R2 and R′2 would be quenched and both voltmeters V2 and V′2 would indicate persistent current in locations 1 and 2 of word 2.

To write in word 3, conductors W and E″ would be supplied current in the sequence described with respect to FIG. 3. Both locations 1 and 2 would be enabled, but write current would be supplied only to location 1, and persistent current would be established only therein.

The three operations just described may be carried out simultaneously without interference with each other. Supply of current to conductors R1, R′1, R2 and R′2 has no effect on the persistent current condition in any of the words. Supply of current to conductor Q1 affects only the gate portions of read conductors R1 and R′1 in word 1; while supply of current to conductor Q′2 affects only the gate portions of read conductors R2 and R′2 in word 2. Further, the small write current in conductors W and W′ passes mostly through paths P1 of each location, owing to the lower inductance of path P1, and has substantially no effect on current in path P2.

As shown in FIG. 6, the cell of FIG. 4 may be connected in a matrix in such a way as to permit transfer of information from word to word. For this purpose one read conductor R1 or R′1 is connected with one write connector W or W′ through contactors S6 or S7 of a relay 11 to a common current source I6 or I7 which is a fraction (approximately ½ Ik) of that required to quench the read gates G1. The write lines W and W′ respectively include tin gates G6 and G7 controlled by a reset conductor 67. Conductor 67 is supplied through a contactor S67 of a relay 12 to a source of current I8 sufficient to quench the reset gates G6 and G7.

The quenching and enable conductors, e.g. Q1 and E′, are supplied current equal to critical current from supplies I12 and I13 through contactors Sg and Se of a relay 10. Relays 10, 11 and 12 are energized from a source I5 by a rotary wiper 13 which makes contact with terminals 14, 15 and 16 in the sequence 15 alone, 15 and 14, 14 alone, 14 and 16, 14 alone, none.

Suppose a zero (no persistent current) is stored in bit 1 of word 1, and a one is stored in bit 2. To transfer these conditions to word 2, the wiper 13 causes relays 10, 11 and 12 to go through one cycle during which gates G6 and G7 are quenched, current is supplied from both sources I6 and I7 and diverted by the quenched gates G6 and G7 to read lines R1 and R′1 respectively. Thereafter the interrogate conductor Q1 of word 1 and the enable conductor E′ of word 2 are supplied current. Current through conductor E′ quenches both gates Ge of word 2. In word 1, bit 1 no persistent current is present and the current induced by conductor Q1 is insufficient alone to quench read gate G1. Consequently the current to conductor R1 from source I6 remains in conductor R1 and has no effect on word 2, bit 1. But in word 1, bit 2, the persistent current combines with the current induced by conductor Q1 to quench the read gate G1 of word 1, bit 2 and direct all current from source I7 to the write conductor W′ and the path P2 of word 2, bit 2. Interruption of current to the interrogation conductor and enable conductor E′ followed by interruption of current from supply I6 will then cause persistent current to be established in word 2, bit 2, as in word 1, bit 2.

Figure 7:
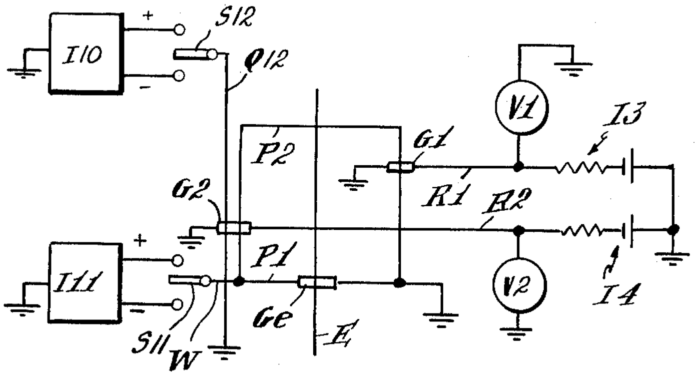
FIG. 7 is a schematic diagram of a modified cell circuit.

FIG. 7 illustrates how a resistance in the gates of either of two read conductors R1 and R2 may be produced with only one interrogate conductor Q12. The conductor Q12 is connected by a three-position switch S12 to a current source I10 with positive and negative terminals. If switch S12 is thrown to the positive terminal, gate G1 in conduit R1 will be affected as described with respect to FIG. 3. If switch S12 is thrown to the negative terminal gate G2 will be respectively quenched or unaffected if persistent current does or does not exist in the loop formed by paths P1 and P2.

FIG. 7 also illustrates how both a clockwise and a counterclockwise persistent current may be set up in the loop P1, P2. The write conductor W is capable of being connected through a switch 11 to a current supply I11 having positive and negative terminals. If switch 11 connects conductor W to the positive terminal in the sequence described, then clockwise persistent current is established in the loop P1, P2. When conductor W is connected to the negative terminal counterclockwise current is established. Connection of interrogation conductor Q12 to the positive terminal of current supply I10 would cause gate G1 to be quenched if clockwise persistent current were present, gate G2 if counterclockwise current were present, and neither gate if no persistent current were present.

Figure 8:
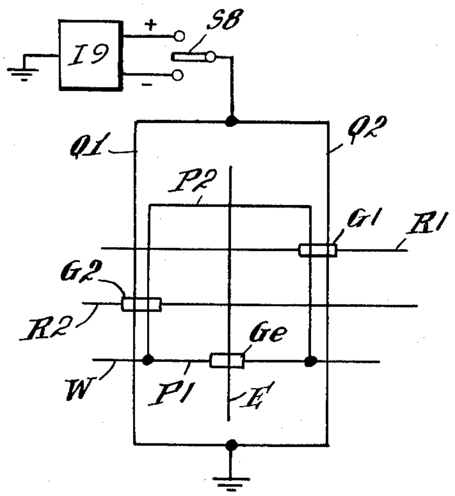
FIG. 8 is a schematic diagram of another modified cell.

FIG. 8 shows a modification of the cell of FIG. 3 in which the two interrogate conductors Q1 and Q2 are connected in parallel which is connected through a three-position switch S8 to a current supply I9 having positive and negative terminals. This supply provides current approximately equal to the critical value of current for quenching the read gates G1 and G2. Assuming a clockwise persistent current has been established in the loop P1, P2, read out on conductor R1 is obtained by transferring switch S8 to the positive terminal. Current from the supply I9 is divided equally between the two interrogation conductors. Since their combined inductance is one-half that of one alone, the time for interrogation can be less. At read gate G2 the persistent current and interrogation current, each approximately one-half critical, cancel and have no effect; but at read gate G1 these currents reinforce and quench gate G1 indicating the presence of persistent current. If switch S8 connects to the negative terminal then the currents reinforce at gate G2 but oppose at gate G1. If no persistent current exists interrogate current of either polarity is insufficient to quench either gate. In this embodiment only the persistent current passes through the enable gate G*e*, and hence this gate may be narrower without danger of inadvertent quenching.

It can be seen from the foregoing description that the present memory cell may be used as a single or multiple access binary cell and as a ternary (three digit) cell. By providing a cell to which access can be had in two ways, and which can be connected in a matrix so as to permit simultaneous interrogation of two words and transfer from one word to another the operation time of the matrix can be substantially reduced.

It should be understood that the present disclosure is for the purpose of illustration only and that this invention includes all modifications and equivalents which fall within the scope of the appended claims.

I claim:

1. A persistent current memory cell comprising a first superconductive path, a second superconductive path forming with said first path a closed, wholly superconductive loop adapted to support a persistent current, control means for quenching the first path, an output gate in quenching relation to the second path, an interrogate conductor in inductive relation to said second path such that current through said interrogate conductor induces a current in said loop and causes said loop to apply to said output gate a magnetic field whose vector sum includes the field of said induced current and persistent current, thereby to quench said output gate depending on the persistent current condition of said loop.

2. A persistent current memory cell comprising a first superconductive path, a second superconductive path forming with said first path a closed, wholly superconductive loop adapted to support a persistent current, control means for quenching the first path, an output gate in quenching relation to the second path, and an interrogate conductor in inductive relation to said second path such that current through said interrogate conductor induces a current in said loop and causes said loop to apply to said output gate a magnetic field whose vector sum includes the field of said induced current and persistent current, thereby to quench said output gate depending on the persistent current condition of said loop, said interrogate conductor being spaced from said output gate so as to be incapable of applying a magnetic field directly thereto.

3. A persistent current memory cell comprising a first superconductive path, a second superconductive path forming with said first path a closed, wholly superconductive loop adapted to support a persistent current, control means for quenching the first path, an output gate in quenching relation to the second paah, and an interrogate conductor in inductive relation to said second path such that current through said interrogate conductor induces a current in said loop and causes said loop to apply to sail output gate a magnetic field whose vector sum includes the field of said induced current and persistent current, thereby to quench said output gate depending on the persistent current condition of said loop, said interrogate conductor being spaced from said output gate so as to be capable of applying a magnetic field directly thereto, and a second readout gate in the field of said interrogate conductor and persistent current loop.

4. A persistent current memory cell comprising a first superconductive path, a second superconductive path forming with said first path a closed, wholly superconductive loop adapted to support a persistent current, control means for quenching the first path, an output gate in quenching relation to the second path and an interrogate conductor in inductive relation to said second path and in quenching relation to said gate such that current through said interrogate conductor induces a current in said loop and causes said loop and said interrogate conductor to apply to said output gate a magnetic field whose vector sum is equal to the field of said induced current, said persistent current and the current through said interrogate conductor, thereby to quench said output gate depending on the persistent current condition of said loop.

5. A persistent current memory cell comprising a first superconductive path, a second superconductive path forming with said first path a closed, wholly superconductive loop adapted to support a persistent current, control means for quenching the first path, an output gate in quenching relation to the second path, an interrogate conductor in inductive relation to said second path and in quenching relation to said gate such that current through said interrogate conductor induces a current in said loop and causes said loop and said interrogate conductor to apply to said output gate a magnetic field whose vector sum is equal to the field of said induced current, said persistent current and the current through said interrogate conductor, thereby to quench said output gate depending on the persistent current condition of said loop, and means to supply interruptible current of two polarities to said interrogate conductor.

6. A persistent current memory cell comprising a first superconductive path, a second superconductive path forming with said first path a closed, wholly superconductive loop adapted to support a persistent current, control means for quenching the first path, first and second output gates in quenching relation to the second path, and first and second interrogate conductors in inductive relation to said second path such that current through each said interrogate conductor induces a current in said loop and causes said loop to apply to said first and second output gates respectively a magnetic field whose vector sum includes the field of said induced current and persistent current, said first interrogate conductor being spaced from said first output gate so as to be incapable of applying a magnetic field directly thereto and said first interrogate conductor being disposed adjacent and in magnetic field applying relation to said second output gate, and said second interrogate conductor being spaced from said second output gate and being incapable of applying a magnetic field directly thereto and said second interrogate conductor being disposed adjacent and in magnetic field applying relation to said first output gate, whereby interrogation current can be supplied to said interrogate conductors thereby to quench said output gates depending on the persistent current condition of the loop, and whereby current in either interrogate conductor does not quench its adjacent gate irrespective of the persistent current condition of the loop.

7. A persistent current memory cell comprising a first superconductive path, a second superconductive path forming with said first path a closed, wholly superconductive loop adapted to support a persistent current, control means for quenching the first path, an output gate in quenching relation to the second path, an interrogate conductor in inductive relation to said second path, and means controllably supplying current to said conductor such that current through said conductor induces a current in said loop and causes said loop to apply to said output gate a magnetic field whose vector sum includes the field of said induced current and persistent current, thereby to quench said output gate depending on the persistent current condition of said loop.

8. A matrix comprising a plurality of persistent current memory cells, each cell comprising a first superconductive path, a second superconductive path forming with said first path a closed, wholly superconductive loop adapted to support a persistent current, control means for quenching the first path, an output gate in quenching relation to the second path, and an interrogate conductor in inductive relation to said second path such that current through said interrogate conductor induces a current in said loop and causes said loop to apply to said output gate a magnetic field whose vector sum includes the field of said induced current and persistent current, thereby to quench said output gate depending on the persistent current condition of said loop, at least two of said interrogate conductors being connected in series.

9. A matrix comprising a plurality of persistent current memory cells, each cell comprising a first superconductive path, a second superconductive path forming with said first path a closed, wholly superconductive loop adapted to support a persistent current, control means for quenching the first path, first and second output gates in quenching relation to the second path, and first and second interrogate conductors in inductive relation to said second path such that current through each said interrogate conductor induces a current in said loop and causes said loop to apply to said first and second output gates respectively a magnetic field whose vector sum includes the field of said induced current and persistent current, said first interrogate conductor being spaced from said first output gate so as to be incapable of applying a magnetic field directly thereto and said first interrogate conductor being disposed adjacent and in magnetic field applying relation to said second output gate, and said second interrogate conductor being spaced from said second output gate and being incapable of applying a magnetic field directly thereto and said second interrogate conductor being disposed adjacent and in magnetic field applying relation to said first output gate, whereby interrogation current can be supplied simultaneously to two interrogate conductors respectively of two different cells, thereby independently to quench output gates respectively in said two different cells depending on the persistent current condition of the cells, and whereby current in either interrogate conductor does not quench its adjacent gate irrespective of the persistent current condition of the loop, at least two of said first interrogate conductors being connected in a first series, and at least two of said second conductors being connected in a second series.

10. A memory cell comprising three strata, a superconductive output gate in the first stratum, first and second paths forming a closed wholly superconductive loop in the second stratum, an enable conductor and an interrogation conductor in the third stratum, and means supporting said strata in spaced, insulated relation, said enable conductor being in quenching relation to said first path, said output gate being in quenching relation to said second path, and said interrogation conductor being in inductive relation to said loop.

References Cited by the Examiner

Page 120, March 1961, "Associative Memory," by R. F. Rosin, IBM Tech. Dist. Bull., vol. 3, No. 10.

IRVING L. SRAGOW, *Primary Examiner.*